Jan. 8, 1963 F. A. KROHM 3,071,849
TOOL
Filed Sept. 25, 1959

INVENTOR.
FRED A. KROHM
BY W. E. Recktenwald
C. S. Penfold
ATTORNEYS

United States Patent Office 3,071,849
Patented Jan. 8, 1963

3,071,849
TOOL
Fred A. Krohm, Hobart, Ind., assignor to The Anderson Company, a corporation of Indiana
Filed Sept. 25, 1959, Ser. No. 842,405
1 Claim. (Cl. 29—270)

This invention relates to a tool and more particularly to a tool for use in detaching the socketed head of a windshield wiper arm from its oscillatory drive shaft.

On installation, the head of a wiper arm must be securely connected to the end of its oscillatory drive shaft, and to separate this connection for the purpose of replacement or repair of wiper arms, and without damaging the finish of the vehicle, has long posed a problem to the serviceman. In instances where the connection has existed for a considerable period, the connection tends to freeze, rendering removal even more difficult. The removal of arms having an associated cam mechanism for varying the attitude of the wiper during its sweep across the glass, of which the U.S. patent to Deibel 2,781,540 is illustrative, introduces a still further problem, for due to the spring normally biasing the cam elements into interlocked position, the arm must be pulled radially of its oscillatory drive shaft while the head is being drawn and/or pried axially from its shaft.

It is, therefore, the principal object of this invention to provide an improved windshield wiper arm remover wrench adapted for removing the leading current types of windshield wiper arms from their associated pivot shafts.

It is an object of this invention to provide an improved tool or wrench for detaching windshield wiper arms of the type having cam mechanisms for cyclically varying the attitude of the wiper relative to the windshield.

It is another object of this invention to provide an improved tool or wrench for detaching windshield wiper arms of the types having nut-and-screw attaching means or pivoted latch-attaching means.

It is still another object to provide a tool of the kind indicated which is inexpensive to manufacture, light in weight, and easily manipulated for detaching a windshield wiper arm.

It is yet another object of this invention to provide an improved tool for the purpose indicated which is simple in construction and can be manufactured relatively cheaply by a simple stamping operation and with a high degree of accuracy.

These and other objects and advantages of the invention will be best understood from a consideration of the following detailed description taken in connection with the drawing forming part of the specification with the understanding, however, that the invention is not confined to any strict conformance with the showing of the drawing, but may be changed or modified so long as such changes or modifications mark no material departure from the salient features of the invention as expressed in the appended claim.

Figure 1:
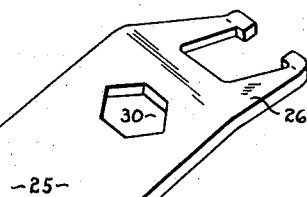
FIGURE 1 is a perspective view of the tool or wrench constituting the present invention.
Figure 3:
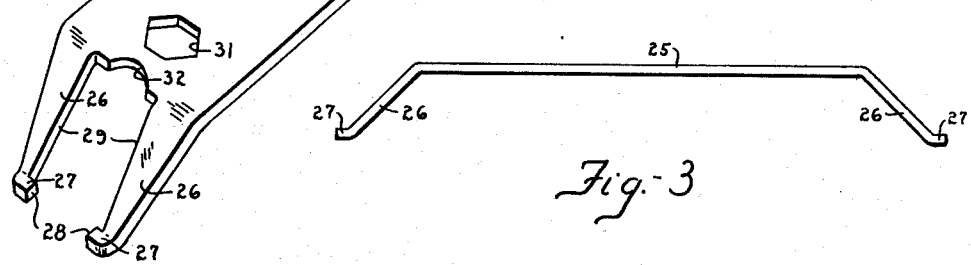
FIGURE 3 is a side or edge view thereof.
Figure 2:
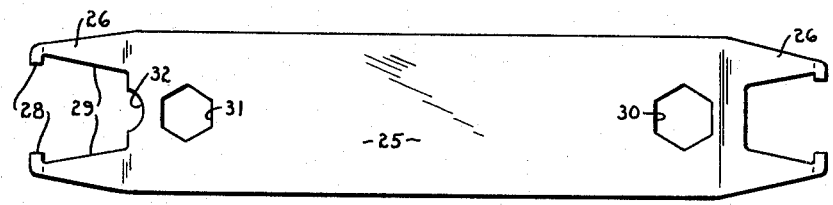
FIGURE 2 is a plan view thereof.
Figure 4:
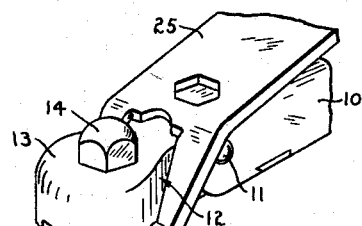
FIGURE 4 depicts the manner of using the tool of this invention to remove a presently popular nut-and-screw type windshield wiper arm.
Figure 5:
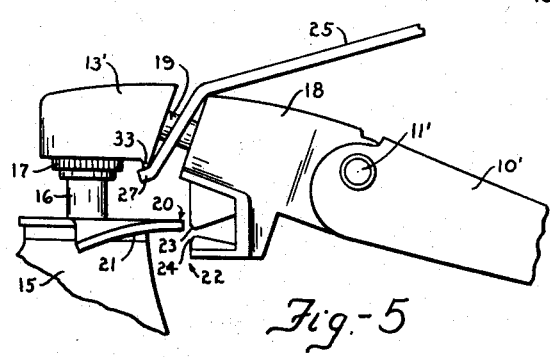
FIGURE 5 illustrates the manner of using the same tool for removing a windshield wiper arm having associated therewith a cam for varying the attitude of the wiper arm during its sweep over the windshield.

Referring to the drawings, wherein similar reference numerals designate similar parts, and more particularly to FIGURES 4 and 5, illustrating the two most common types of windshield wiper structures now in use, numeral 10 designates a conventional wiper carrying arm (shown broken off). The arm is pivoted at 11 to a reduced shank 12 of a head 13. The head is formed with a fluted socket in its underside, which socket receives the sulcated upper end of an oscillatory drive shaft or a drum carried thereby (not shown). A cap nut 14 is threaded to said shaft for fixing the head and wiper arm upon the shaft.

The wiper structure shown in FIGURE 5 depicts broadly the cam-type windshield wiper arm mechanism referred to above. In general, 15 designates a bearing boss in which is journaled oscillatory pivot shaft 16. Keyed or otherwise fixed to the upper end of shaft 16 is a drum 17 having sulcations extending lengthwise of its outer wall. Head 13' has a socket formed therein, the socket being formed with ribs matching those of the drum 17 for preventing rotational slippage between the drum and head. An arm mounting section 18, to which wiper carrying arm 10' is pivotally connected at 11', has a pin 19 projecting therefrom into engagement with head 13' so that mounting section 18 is pivotally mounted on said pin, whereby the wiper arm may be rocked substantially on its own longitudinal axis for varying the attitude of the wiper (not shown) to the windshield. There is a spring structure within the mounting section 18 which spring normally biases the mounting section into contact with head 13'. A cam structure 20 is provided for shifting the wiper arm about its longitudinal axis for varying the attitude of the wiper blade relative to the windshield at various stages of its stroke. This structure comprises a cam plate 21 fixed upon the end of boss 15. Mounting section 18 is provided near one edge with follower structure 22, defining spaced portions 23, 24, adapted to receive cam plate 21 therebetween. It will be apparent that as wiper arm 10' is swung in its normal wiping cycle, the follower structure will ride along plate cam 21 to turn the wiper arm substantially about its longitudinal axis, in accordance with the pattern of the cam. It will further be apparent that head 13' can be lifted from drum 17 only while mounting section 18 is pulled to the right, as shown in FIGURE 5, to free follower 22 from cam 21.

The tool of the present invention is devised for removing all windshield wiper arms, but more particularly for use in removing the wiper structures of FIGURES 4 and 5. This tool includes an elongate flat body 25 of heavy sheet metal constituting a handle. A pair of arms or prongs 26, shown tapered, project from opposite ends of the handle and at an acute angle thereto. For optimum ease of manipulation, the angle between the prongs and the body of the handle should be on the order of 45 degrees, but said angle may be varied a number of degrees either way and still serve satisfactorily. Prongs 26 should be long enough that their tips will reach below the edge of the head when the tool is applied, as in FIGURE 4 or 5. The ends of each pair of prongs terminate in shoulders 27 disposed substantially parallel to the plane of the handle. The shoulders 27 are formed with inwardly extending opposed lugs 28 adapted to engage beneath the side edges of the socket of head 13 in removing the head.

The length and spacing of the sets of prongs on opposite ends of handle 25 may differ to the extent necessary to adapt the device to the dimensions of the two types of wiper head most commonly employed in this country. The opposed side edges 29 of the prongs are inclined to correspond with the shape of the shank 12 of the type of the wiper head shown in FIGURE 4, thus assuring that in use the lugs 28 will be properly positioned under the edge of the head and at spaced points along the circumference of the socket.

The handle is further formed with a pair of hexagonal openings 30, 31, whereby the handle may serve as a wrench for removing either size of securing nut 14 likely to be encountered. When the tool is not in use, these openings may serve for hanging up the tool. The one end portion of the handle, between the prongs 26, is formed with a semicircular recess 32 which provides clearance for the tool when it is being used on certain late model windshield wiper arms having longitudinal ribs or embossments formed on the face of mounting section 18. The recess 32 provides clearance so that a gauge or mark will not be formed into the crest of the rib on the arm.

It will be seen that the tool of this invention can be produced entirely by conventional stamping and punching machinery, thus lending itself to economical manufacture.

To remove a wiper head of the type shown in FIGURE 4, after first loosening cap nut 14, the tool is manipulated so that prongs 26 are passed downwardly over the reduced shank portion 12 of the head. Upon tilting the handle toward the position shown, lugs 28 will engage beneath the side edge portions of the head 13. In gripping the tool, normally the handle will be against the palm of the hand with the fingers extending beneath arm 10, thus effecting a solid connection of the handle to the head. Upon pulling axially of the shaft, accompanied by a little rocking movement, the head will readily separate from its shaft.

To remove the type of wiper shown in FIGURE 5, wiper arm 10' must be pulled endwise to separate mounting section 18 from head 13' to permit insertion of the prongs 26 of the tool to the position shown, with the shoulders 27 under the lip 33 of the rear wall of head 13'. The hand will then be grasped around the tool handle, with some of the fingers under mounting section 18 and/or arm 10'. By simultaneously gripping and pulling upwardly on the parts mentioned, the tool will exert both a prying and pulling action on the head. In stubborn situations a slight rocking of the hand will tend to loosen the bond between the head and shaft to facilitate removal.

In the drawing and specification, there has been set forth a preferred embodiment of the invention, and although specific terms are employed they are used in a generic and descriptive sense only and not for purposes of limitation, the scope of the invention being defined in the following claim.

I claim:

A tool for withdrawing the socketed head of a wiper arm from a mounting on a drive shaft, said tool comprising an elongate substantially rectangular planar inflexible body constructed from a single piece of sheet metal having a uniform thickness, said body having a planar extremity disposed at an oblique angle with reference to the plane of the body and having outer marginal edge portions converging toward one another, said extremity being provided with a cutout defining a pair of legs having inner marginal edge portions diverging away from one another so that the outer and inner edge portions impart a taper to each of the legs, said legs having offsets at their free ends, and said offsets being provided with lugs inturned toward one another in lateral relation to said inner edge portions and having upper surfaces for engaging the underside of the arm head to facilitate its withdrawal away from the shaft mounting when the arm head is received between the legs.

References Cited in the file of this patent

UNITED STATES PATENTS

| | | |
|---|---|---|
| 333,539 | Palmer | Jan. 5, 1886 |
| 2,461,639 | Gugalunus | Feb. 15, 1949 |
| 2,613,562 | Clark | Oct. 14, 1952 |
| 2,754,582 | Klok | July 17, 1956 |
| 2,811,061 | Radovich | Oct. 29, 1957 |

FOREIGN PATENTS

| | | |
|---|---|---|
| 16,112 | Australia | Jan. 11, 1935 |